May 19, 1970     D. W. BOTIMER     3,512,793
QUICK CHANGE TOOL HOLDER
Filed July 11, 1967     3 Sheets-Sheet 1
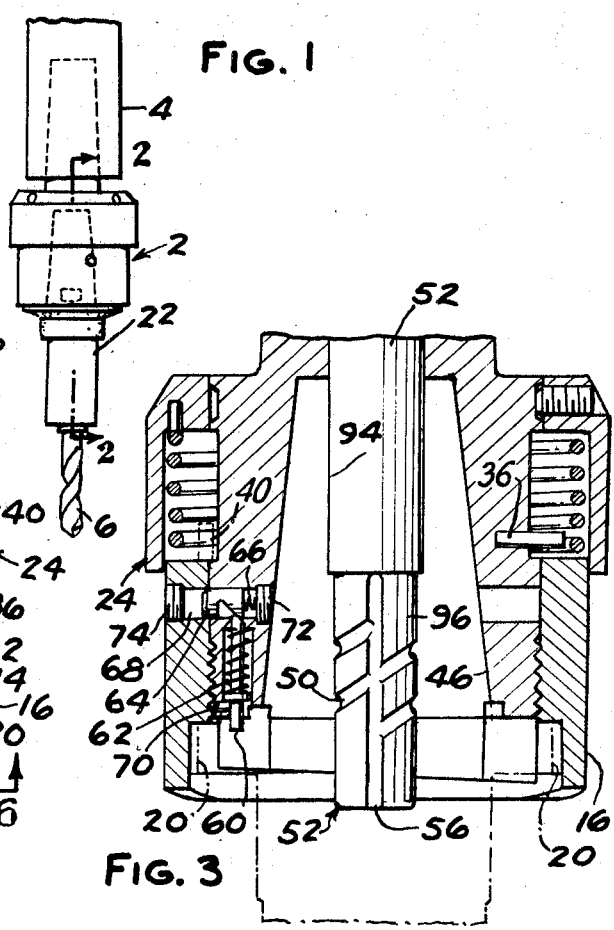
FIG. 1
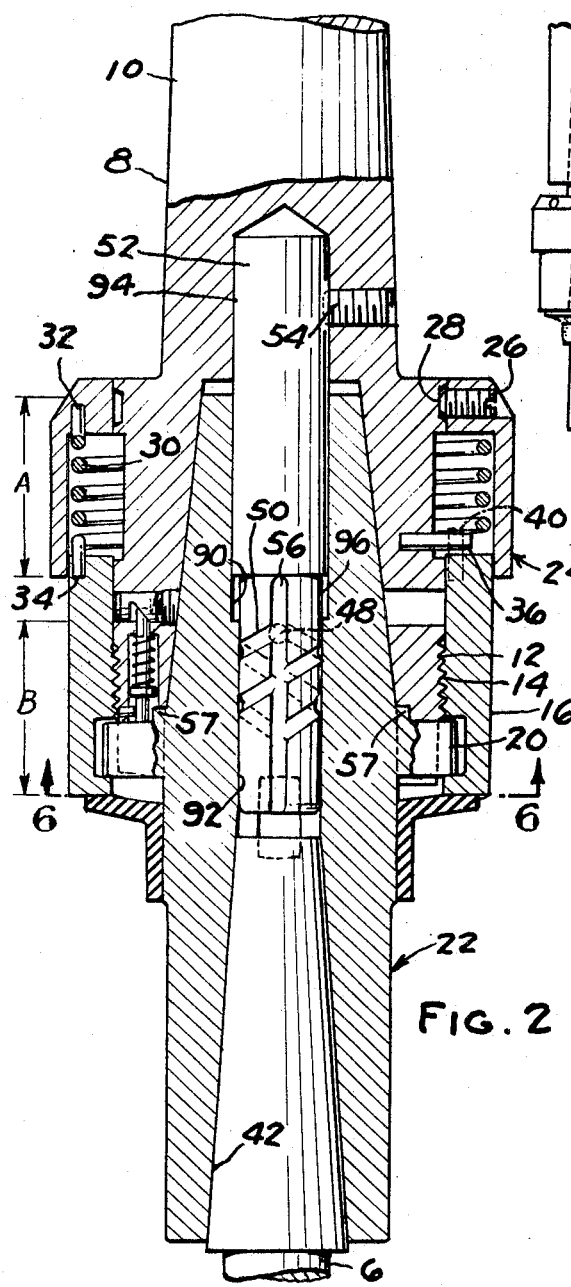
FIG. 2
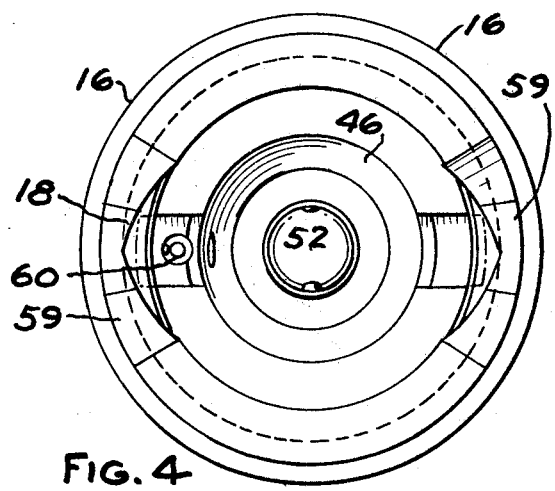
FIG. 3
FIG. 4
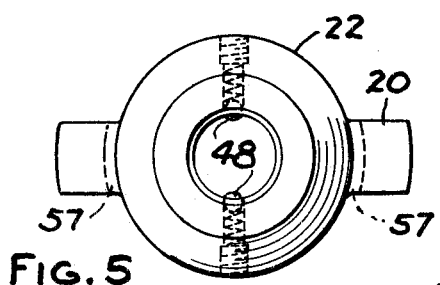
FIG. 5
INVENTOR.
DONALD W. BOTIMER
BY
Barnes, Kisselle, Raisch & Choate
ATTORNEYS

United States Patent Office 3,512,793
Patented May 19, 1970

3,512,793
QUICK CHANGE TOOL HOLDER
Donald W. Botimer, 644 Easgrate Drive,
Frankenmuth, Mich. 48734
Filed July 11, 1967, Ser. No. 652,591
Int. Cl. B23b *31/06*
U.S. Cl. 279—91                                    7 Claims

ABSTRACT OF THE DISCLOSURE

This invention relates to quick change tool holders and discloses an improved version of a tool holder in which tools can be inserted and removed, while the holder is rotating thereby reducing tool set-up time.

BACKGROUND OF THE INVENTION

This invention relates to a new and useful improvement in quick change tool holders whereby tools can be inserted into and removed from the tool holder while it is rotating.

The closest prior art known to the applicant is the A. E. Nickless Pat. No. 2,719,722, issued on Oct. 4, 1955. The Nickless patent teaches a somewhat similar means of securing or locking a tapered tool adapter with lugs at one end in the main body of a tool holder by the use of a right-hand threaded locking nut to provide a camming action on the adapter lugs which forces the adapter into a tapered receptacle in the main body of the tool holder.

The applicant's invention discloses an advance over the prior art in that it provides a means for inserting and removing tools while the holder is rotating which cannot conveniently be done with the prior are device because of its right-hand threaded locking nut. The applicant's device also provides a means for guiding, feeding, and positively controlling the entrance of the tool adapter into the main body of the tool holder.

In addition, the device automatically moves to a locking position as the tool moves toward a seated position. The device is relatively simple in construction and safe for a tool operator to handle. It is also especially adapted to automatic tool changing equipment where no operator is at hand.

DESCRIPTION OF THE INVENTION

A principal object of this invention is to provide a quick change tool holder in which the tools can be inserted and removed while the holder is rotating thereby decreasing machine down time for tool changes.

Another object of this invention is to provide a means of guiding the tool into the holder.

Another object of this invention is to provide a means of controlling the feeding of the tool into the holder to prevent the jamming and locking of the tool in the holder.

A further object of this invention is to provide a means of automatically actuating the camming action of the locking means.

A still further object of this invention is to provide a means of releasing or reversing the locking means while the holder is rotating.

Other objects and features will be apparent from the following disclosure and claims which set forth the manner of making and using the invention in the best mode contemplated by the inventor.

Drawings accompany the disclosure and the various views thereof may be briefly described as:

FIG. 1, a side elevational view of the device inserted in a spindle and holding a cutting tool.

FIG. 2, a sectional view on line 2—2 of FIG. 1.

FIG. 3, a view of a portion of FIG. 2 with the tool holder adapter removed.

FIG. 4, an end elevational view of the device with the tool holder adapter removed.

FIG. 5, an end elevational view of the tool holder adapter.

Figure 6:
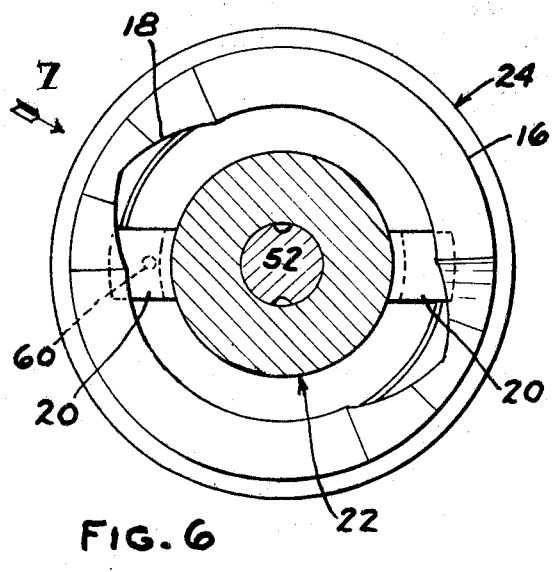

FIG. 6, a sectional view on line 6—6 of FIG. 2.

Figure 7:
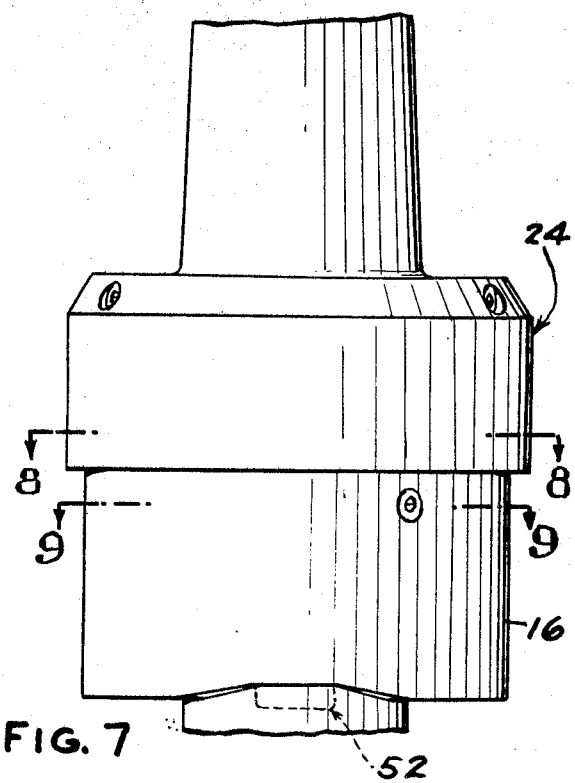

FIG. 7, a side elevational view of FIG. 6.

Figure 8:
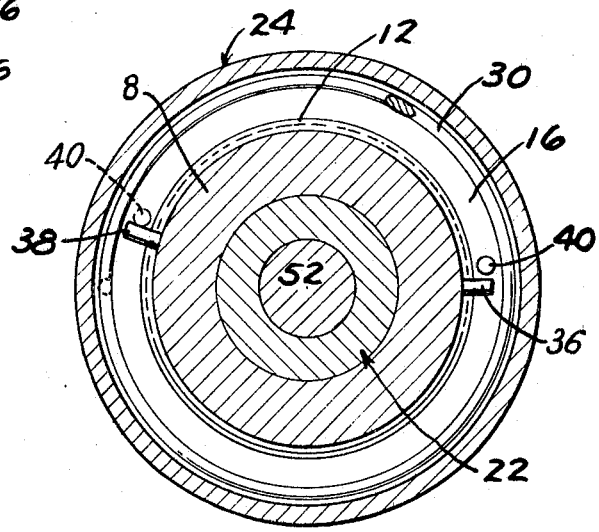

FIG. 8, a sectional view on line 8—8 of FIG. 7.

Figure 9:
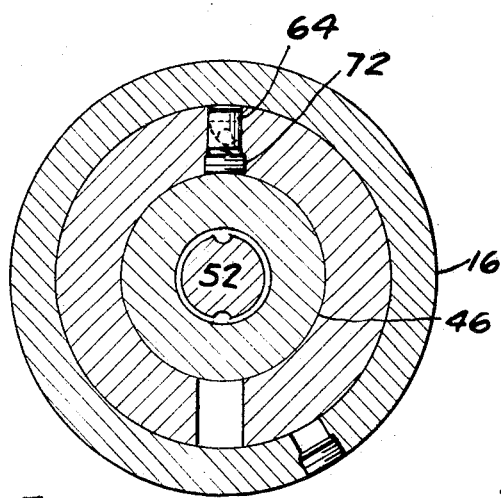

FIG. 9, a sectional view on line 9—9 of FIG. 7.

Figure 10:
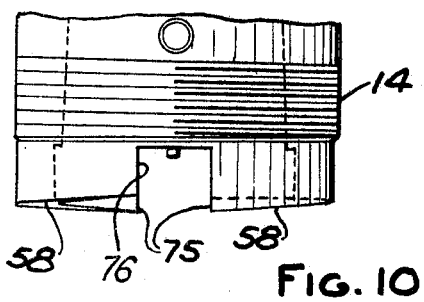

FIG. 10, a fragmentary side elevational view of the lower portion of the main body of the device.

Figure 11:
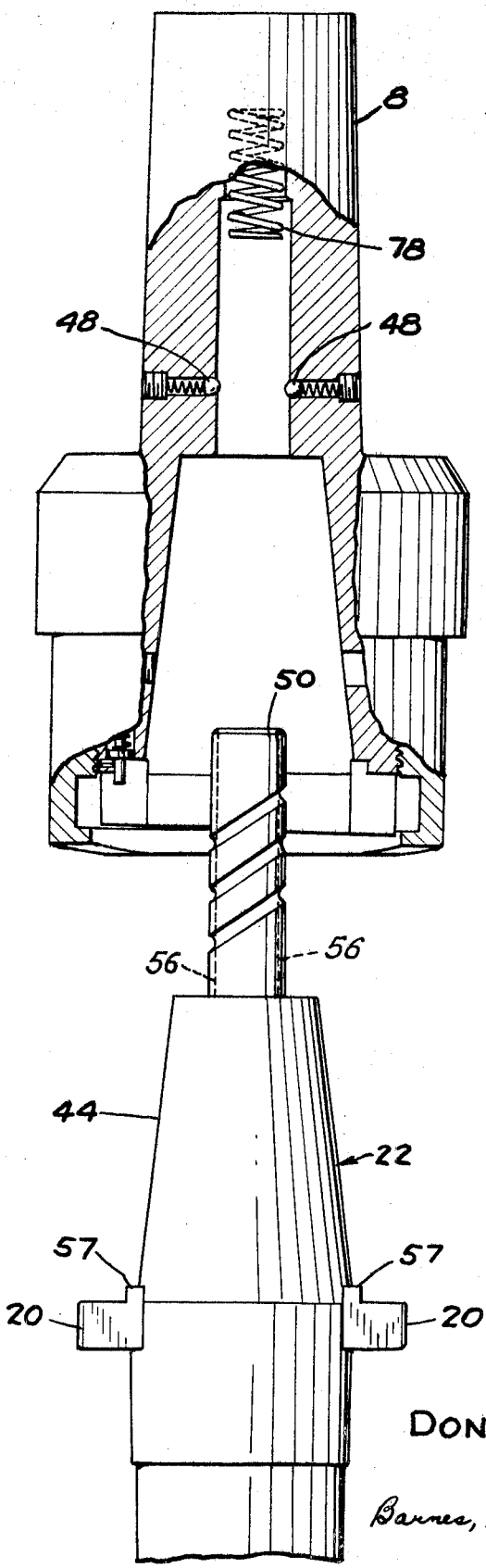

FIG. 11, a fragmentary side elevational view showing an optional self-feeding adapter design.

REFERRING TO THE DRAWINGS

In FIG. 1, the quick change tool holder 2 is inserted in a spindle 4 rotating in a clockwise direction and is holding a cutting tool 6.

In FIG. 2, a main body 8 has an external taper 10 to fit the spindle 4 in which the tool holder 2 is used. The main body 8 has external left-hand threads 12 which mate with internal threads 14 in a locking ring 16 which contains adequate clearance openings 18 (as shown in FIG. 4) to pass lugs 20 of an adapter 22 (which will be detailed below). A collet 4 is secured to body 8 by threaded screws 26 riding in a groove 28 of body 8 and captivates a torsional spring 30, one end of which is captivated by an opening 32 in collet 24 and the other end of which is captivated by an opening 34 in locking ring 16. The torsional pre-loading of spring 30 can be adjusted by rotating collet 24 relative to main body 8. When the tool holder 2 is assembled, the rotation of locking ring 16 relative to body 8 is limited by the stop pins 36, 38 in body 8 and a bumper pin 40 in locking ring 16 (as shown in FIGS. 3 and 8).

The adapter 22 contains an interal taper 42 to accommodate cutting tools 6 with which the quick change tool holder 2 is used, and an external taper 44 that mates with an internal taper 46 in main body 8 which in combination with locking ring 16 securely holds adapter 22 in main body 8.

The adapter 22 contains spring loaded detent balls 48 which ride in spiral grooves 50 (as shown in FIG. 3) in a guide pin 52 which is rigidly secured to main body 8 by threaded screws 54. This arrangement facilitates inserting adapter 22 into main body 8 because holder 22 is pulled or fed into main body 8 by spiral grooves 50 when main body 8 is rotated clockwise relative to the adapter 22. The straight vertical grooves 56 guide adapter 22 when it is removed from main body 8.

As shown in FIG. 10, lower surfaces 58 or main body 8 are provided with clearance matching the lead of spiral grooves 50, thereby providing a positively controlled rotary feeding of adapter 22 into tapered opening 46 in main body 8. This provides ample clearance for the functioning parts of adapter 22 in main body 8 as will be described below.

FIG. 11 shows a alternate design incorporating the self-feeding adapter feature in which spring loaded detent balls 48 are contained in main body 8, and spiral grooves 50 and straight vertical grooves 56 are contained in adapter 22.

As shown in FIGS. 2 and 3, an anvil trigger pin 60 biased by a compression spring 62 actuates a control pin 64 biased by a compression spring 66 which slidably engages a lock opening 68 in locking ring 16. Threaded screws 70, 72 captivate pins 60, 64 in main body 8. Threaded screw 74 in lock opening 68 prevents the loss of control pin 64 if it should become disengaged from anvil trigger pin 60.

When installing a cutting tool 6 in a quick change tool holder 2 which is rotating in a clockwise direction (as shown in FIG. 1) the operator starts adapter 22 on guide pin 52, then spiral grooves 50 and detent balls 48 feed adapter 22 into main body 8 until adapter lug control surfaces 57 contact one wall 75 of the lug receiving recesses 76 of main body 8 which orients the adapter lugs 20 with said recesses 76 (as shown in FIG. 4) in main body 8. Clearance depressions 59 are provided in locking ring 16 so that the lug control surfaces 57 feed along but preferably out of contact with the main body lower control surfaces 58 (see FIG. 10). When adapter lugs 20 strike corners 75 and seat in recesses 76 in main body 8, trigger pin 60 is forced to move against its bias which causes control pin 64 to retract from lock opening 68 allowing locking ring 16, biased by torsion spring 30, to rotate in a clockwise direction (as shown in FIG. 6) forcing and locking adapter 22 into main body 8 in a camming action against the lugs 20.

To remove the adapter 22 from main body 8, locking ring 16 is rotated counterclockwise (as shown in FIG. 1) against its bias until it is properly aligned (as shown in FIG. 4) to allow the adapter 22 to be removed. In a vertical machine the weight of the tool and adapter will cause them to drop from the holder so the operator can retrieve them as they separate from the holder. Proper alignment for adapter 22 removal is assured by stop pin 38 and bumper pin 40 (as shown in FIG. 8).

When adapter 22 is removed, it allows anvil trigger pin 60 to move in the direction of its bias which allows control pin 54 to move in the direction of its bias engaging lock opening 68 in locking ring 16 so that the main body 8 is ready to receive another adapter 22.

When main body 8 is chucked in a vertical spindle 4 (as shown in FIG. 1), adapter 22 will drop out of the main body 8 when locking ring 16 is properly positioned, due to the force of gravity. When the quick change tool holder 2 is used in other positions, an optional biasing means 78 can be included in the design as shown in FIG. 11 to facilitate removal.

It will be noted that the straight groove 56 starts at the lower end of guide pin 52 while the spiral groove 50 starts a distance above the end. On inserting the tool, the balls 48 will cause a rotation of the adapter so that it will start getting up to speed before it hits the spiral upward feed groove. It will be appreciated, of course, that getting the adapter up to speed has the advantage that when the tool seats the lugs 57 will contact the corner 75 with much less shock than if the tool had no rotation momentum. The resiliently-backed balls 48 will absorb the initial shock and gradually bring the adapter up to speed. This facilitates rapid insertion. Of course, upon removal, the adapter and spindle are rotating at the same speed and the balls can fall freely down the drop-out groove 56.

Another feature of the embodiment shown in FIG. 1 which facilitates insertion relates to a double diameter recess in the adapter 22. The diameter at 90 is larger than the diameter at 92 and it will be noted that the center pin 52 has a base diameter 94 slightly larger than the end diameter 96. Similarly, the central recess within the adapter 22 has a larger diameter at the outer end portion than it does at the portion that receives the grooved end of post 52. These diameters are so spaced that it will be seen that the end of the adapter will be reaching the enlarged portion 94 at about the same time that the lower end of the post 52 is entering the reduced diameter section 92. In other words, the dimension A is approximately the same as the dimension B. Thus, the adapter will be well stabilized on the guide post prior to the balls having their resilient engagement with the vertical groove 56 which imparts rotation to the adapter to bring it up to speed. This will prevent a wobbling or orbiting motion of the adapter as it moves in.

It will thus be seen that there is disclosed a quick change chuck which can be readily actuated to release a chucked tool, and which automatically facilitates insertion of a tool by a lead screw pull and a tool triggered release which causes rotation of the spring biased chuck ring to cam the tool and adapter in place.

It will be appreciated that the insertion helical grooves on the pilot post as shown in FIG. 2 or on the adapter as shown in FIG. 11 might be reversed to be put on a cylindrical wall of the holder with a corresponding change of the follower balls on the adapter without departing from the spirit of the invention.

What is claimed as new is as follows:

1. A quick change tool holder to which tools can be attached and removed which comprises:
   (a) a main body having a recess for receiving a tool adapter,
   (b) a tool adapter having a portion to be received in said recess of said body,
   (c) means on said body and means on said adapter to lock said body and adapter for common rotation in driving relationship, said means on said body being movable to a locked and an unlocked position,
   (d) releasable means for retaining said means on said body in an unlocked position,
   (e) means on said adapter for actuating said releasable means to permit motion of said means on said body to a locked position,
   said means on said body comprising a ring surrounding and threadingly engaging said body and having a notched shoulder flange, and said means on said adapter comprising lugs to enter said notches in said ring and be retained by said flange, bias means for urging said ring to a locking position, said releasable means comprising a latch to retain said ring against the pressure of said bias means, said latch being released by entry of said adapted into said recess.

2. A quick change tool holder to which tools can be attached and removed which comprises:
   (a) a main body having a recess for receiving a tool adapter,
   (b) a tool adapter having a portion to be received in said recess of said body,
   (c) means on said body and means on said adapter to lock said body and adapter for common rotation in driving relationship, said means on said body being movable to a locked and an unlocked position,
   (d) releasable means for retaining said means on said body in an unlocked position,
   (e) means on said adapter for actuating said releasable means to permit motion of said means on said body to a locked position, and
   (f) means on said body and means on said adapter operatively engageable to cause a relative axial motion between said parts in response to relative rotational motion therebetween.

3. A quick change tool holder as defined in claim 1 in which said ring is associated with said body with a thread to permit grasping of said ring to move it to an unlocked position when said spindle is rotating in a predetermined direction.

4. A quick change tool holder in which tools can be inserted into and removed from the holder while it is rotating which comprises:
   (a) an adapter to which tools can be attached,
   (b) a main body having an opening with an entrance into which the adapter can be inserted,
   (c) a mecanism for selectively locking the adapter in the main body,
   (d) a means of actuating the locking mechanism after the adapter is inserted while the main body is rotating,
   (e) a means of disengaging the locking mechanism while the main body is rotating, so that the adapter can be inserted, locked, unlocked, and removed from the main body while it is rotating, and
   (f) a means of guiding and feeding the adapter into the main body which comprises a central post projecting from the main body having thereon a helical guidance path means formed on the outer surface thereof starting at a point a predetermined distance from the outer end of said post and a straight guidance path formed also on the outer surface of said post extending from the outer end to a point within the body and resilient follower means on said adapter adjacent the end thereof for initial contact with said straight guidance path to permit a torque to be transmitted between said body when rotating and said adapter when inserted to start moving the adapter to the rotating speed of the spindle as it enters the body.

5. A quick change tool holder in which tools can be inserted into and removed from the holder while it is rotating which comprises:
  (a) an adapter to which tools can be attached,
  (b) a main body having an opening with an entrance into which the adapter can be inserted,
  (c) a mechanism for selectively locking the adapter in the main body,
  (d) a means of actuating the locking mechanism after the adapter is inserted while the main body is rotating,
  (e) a means of disengaging the locking mechanism while the main body is rotating, so that the adapter can be inserted, locked, unlocked, and removed from the main body while it is rotating, and
  (f) a means for guiding and feeding the adapter into and for guiding the adapter out of the main body which comprises means forming a helical guidance path on the surface of one of said elements extending axially thereof, means for forming a straight guidance path on said one of said elements extending axially thereof, and a follower means on the other of said elements having a resilient relationship thereto adapted to be contacted by said straight guidance path to impart a rotative movement to said adapter to bring it up to the speed of rotation of said body as it is inserted into said body.

6. A device as defined in claim 4 in which the central post has a base diameter slightly greater than the diameter of its distal end, and said adapter has a central recess with a greater diameter at its outer end than at its inner end wherein the end of said central post will reach the smaller diameter of said adapter recess at approximately the same time as the larger diameter of said post reaches the outer end of said adapter recess to stabilize the insertion of the adapter.

7. A quick change tool holder in which tools can be inserted into and removed from the holder while it is rotating which comprises:
  (a) an adapter to which tools can be attached,
  (b) a main body having an opening with an entrance into which the adapter can be inserted,
  (c) a mechanism for selectively locking the adapter in the main body,
  (d) a means of actuating the locking mechanism after the adapter is inserted while the main body is rotating,
  (e) a means of disengaging the locking mechanism while the main body is rotating, so that the adapter can be inserted, locked, unlocked, and removed from the main body while it is rotating, and
  (f) a means of centering and guiding the adapter into the main body which comprises a central post projecting from the interior of the main body to a point beyond the entrance of the opening therein, and an opening formed centrally in said adapter to receive said post wherein insertion of said adapter into said body is preceded by insertion of said post into said opening in said adapter to center and guide the adapter into the body opening.

References Cited

UNITED STATES PATENTS

| | | | |
|---|---|---|---|
| 1,069,614 | 1913 | Heinkel et al. | 279—103 |
| 1,157,513 | 8/1915 | Dompier | 279—103 |
| 1,406,220 | 2/1922 | Pickett | 279—81 |
| 3,116,068 | 12/1963 | Pfister et al. | 279—72 |
| 3,396,981 | 8/1968 | Hammond | 279—89 |

FOREIGN PATENTS

| | | |
|---|---|---|
| 555,111 | 8/1943 | Great Britain. |
| 113,486 | 3/1945 | Sweden. |

ROBERT C. RIORDON, Primary Examiner